US011409668B2

(12) United States Patent
 Kim et al.

(10) Patent No.: US 11,409,668 B2
(45) Date of Patent: Aug. 9, 2022

(54) MEMORY MODULE, OPERATION METHOD OF MEMORY MODULE, MEMORY SYSTEM, AND OPERATION METHOD OF MEMORY SYSTEM

(71) Applicant: SK hynix Inc., Gyeonggi-do (KR)

(72) Inventors: Woongrae Kim, Gyeonggi-do (KR);
 Sang-Kwon Lee, Gyeonggi-do (KR);
 Jung-Hyun Kim, Gyeonggi-do (KR);
 Jong-Hyun Park, Gyeonggi-do (KR);
 Jong-Ho Son, Gyeonggi-do (KR);
 Mi-Hyun Hwang, Seoul (KR);
 Jeong-Tae Hwang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 403 days.

(21) Appl. No.: 16/728,143

(22) Filed: Dec. 27, 2019

(65) Prior Publication Data
 US 2020/0356495 A1 Nov. 12, 2020

(30) Foreign Application Priority Data
 May 9, 2019 (KR) .................. 10-2019-0054235

(51) Int. Cl.
 *H04L 29/06* (2006.01)
 *G06F 12/14* (2006.01)
 *H04L 9/08* (2006.01)
 *G06F 3/06* (2006.01)
 *G06F 13/16* (2006.01)

(52) U.S. Cl.
 CPC ........ *G06F 12/1408* (2013.01); *G06F 3/0622* (2013.01); *G06F 3/0658* (2013.01); *G06F 3/0688* (2013.01); *G06F 13/1668* (2013.01); *H04L 9/088* (2013.01); *H04L 9/0894* (2013.01)

(58) Field of Classification Search
 CPC .. G06F 12/1408; G06F 3/0622; G06F 3/0658; G06F 3/0688; G06F 13/1668; H04L 9/088; H04L 9/0894
 USPC ......................................... 713/190
 See application file for complete search history.

(56) References Cited

U.S. PATENT DOCUMENTS

2012/0017097 A1* 1/2012 Walrath ................. G06F 21/86
 713/190
2016/0306750 A1* 10/2016 Tucker ............... G06F 12/1408
2017/0201503 A1* 7/2017 Jayasena ............... G06F 21/85

FOREIGN PATENT DOCUMENTS

KR 10-1915005 1/2019

* cited by examiner

*Primary Examiner* — Evans Desrosiers
(74) *Attorney, Agent, or Firm* — IP & T Group LLP

(57) ABSTRACT

A memory module includes: a plurality of memories, wherein each of the memories comprises: an encryption key storage circuit suitable for storing an encryption key; an address encryption circuit suitable for generating an encrypted address by encrypting an address transferred from a memory controller by using the encryption key stored in the encryption key storage circuit; and a cell array accessed by the encrypted address, wherein the encryption key storage circuits of the memories store different encryption keys.

20 Claims, 4 Drawing Sheets

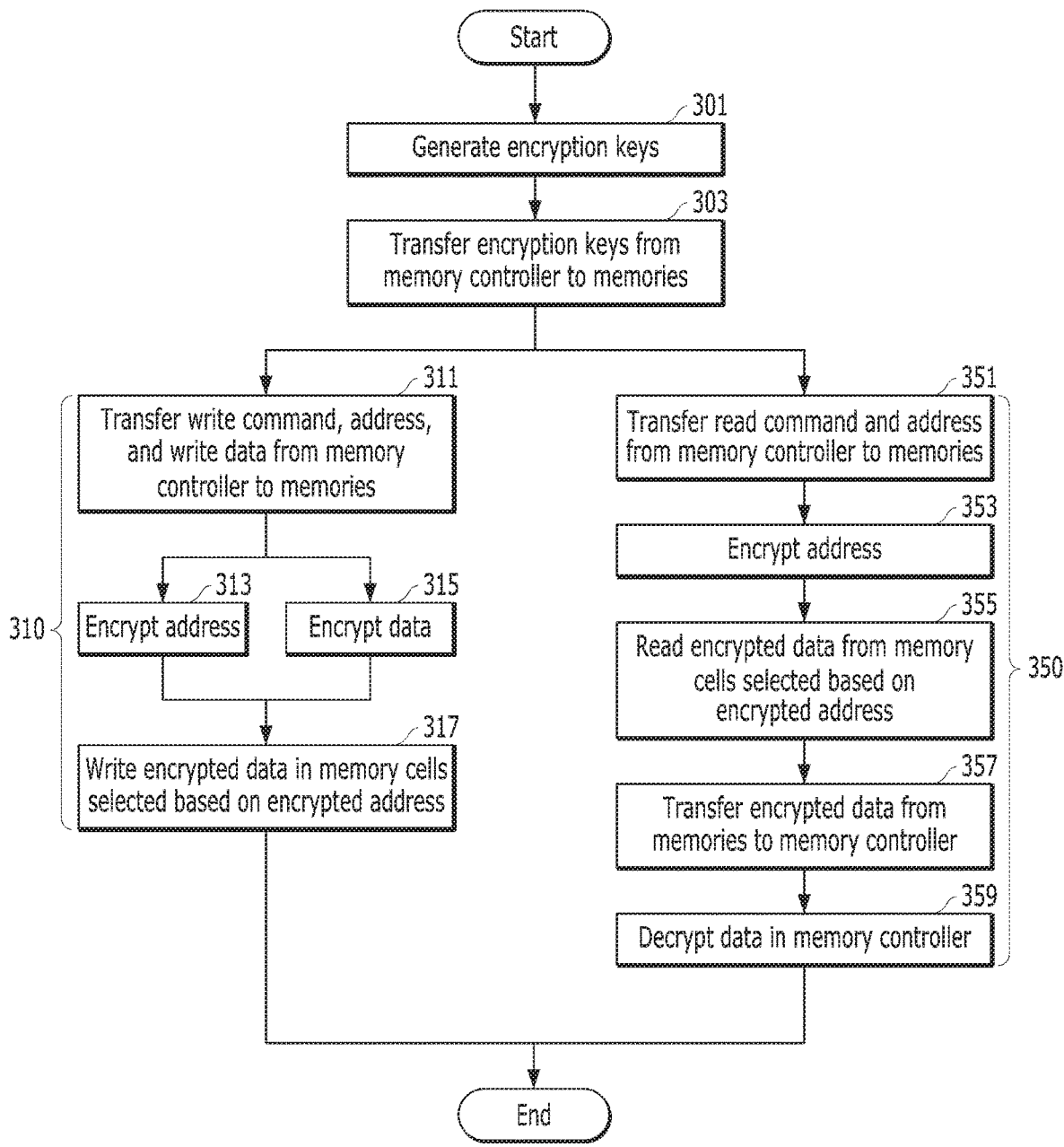

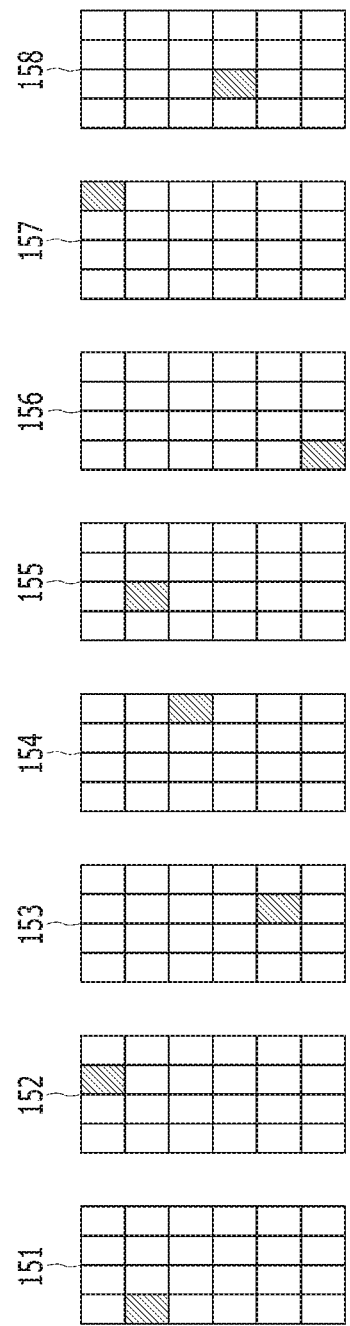

MEMORY MODULE, OPERATION METHOD OF MEMORY MODULE, MEMORY SYSTEM, AND OPERATION METHOD OF MEMORY SYSTEM

CROSS-REFERENCE TO RELATED APPLICATION

The present application claims priority of Korean Patent Application No. 10-2019-0054235, filed on May 9, 2019, which is incorporated herein by reference in its entirety.

BACKGROUND

1. Field

Various embodiments of the present invention relate to a memory system including a memory controller and a memory module.

2. Description of the Related Art

Memory modules such as Dual In-line Memory Modules (DIMMs) are being widely used in various server systems such as a data center. Memory modules used in a data center contain a lot of data that need to be secured. Consequently, there have been attempts for stealing such data. For example, there was an attempt for leaking out data connected to a DIMM by freezing a memory module, such as the DIMM, which is used in a data center, with liquefied nitrogen to retain the data stored therein and then connecting the DIMM to another computer system.

Therefore, technology for preventing this type of data leakage in memory modules and memory systems is needed.

SUMMARY

Various embodiments are directed to technology capable of increasing the security level of a memory system.

In accordance with an embodiment of the present invention, a memory module includes: a plurality of memories, wherein each of the memories comprises: an encryption key storage circuit suitable for storing an encryption key; an address encryption circuit suitable for generating an encrypted address by encrypting an address transferred from a memory controller by using the encryption key stored in the encryption key storage circuit; and a cell array accessed by the encrypted address, wherein the encryption key storage circuits of the memories store different encryption keys.

In accordance with another embodiment of the present invention, a method for operating a memory module provided with a plurality of memories includes: storing different encryption keys in each of the memories; receiving a command and an address in the memories; generating an encrypted address by encrypting the address in each of the memories by using the encryption key of the corresponding memory; and accessing an area designated by the encrypted address in each of the memories.

In accordance with another embodiment of the present invention, a memory system includes: a plurality of memories; and a memory controller suitable for transferring a common command and a common address to the memories, and wherein each of the memories comprises: an encryption key storage circuit suitable for storing an encryption key; an address encryption circuit suitable for generating an encrypted address by encrypting the common address by using the encryption key stored in the encryption key storage circuit; and a cell array accessed by the encrypted address, and wherein the encryption key storage circuits of the memories store different encryption keys.

In accordance with another embodiment of the present invention, a memory system includes: a plurality of memories; and a memory controller, wherein each of the memories comprises: an encryption key storage circuit suitable for storing an encryption key which is different for each of the memories; an data encryption circuit suitable for generating an encrypted data by encrypting write data which is transferred from the memory controller by using the encryption key stored in the encryption key storage circuit during a write operation; and a cell array suitable for storing the encrypted data, wherein the memory controller comprises: a read encryption key storage circuit suitable for storing the different encryption keys of the memories; and a decryption circuit suitable for decrypting data that are read from the memories by using the encryption keys stored in the read encryption key storage circuit during a read operation.

In accordance with another embodiment of the present invention, a method for operating a memory system provided with a plurality of memories and a memory controller includes: transferring different encryption keys from the memory controller to the memories; transferring a command and an address from the memory controller to the memories; generating an encrypted address by encrypting the address by using an encryption key in each of the memories; and accessing an area designated by the encrypted address in each of the memories.

In accordance with another embodiment of the present invention, a method for operating a memory system provided with a plurality of memories and a memory controller includes: transferring different encryption keys from the memory controller to the memories; transferring a write command and data from the memory controller to the memories; generating an encrypted data by encrypting the data by using an encryption key in each of the memories; storing the encrypted data in each of the memories; transferring a read command from the memory controller to the memories; transferring the data read from the memories to the memory controller; and decrypting the data transferred from the memories in the memory controller by using the encryption keys of the memories.

In accordance with another embodiment of the present invention, a memory system includes: a plurality of memories; and a memory controller suitable for transferring a command and an address to the memories, wherein each of the memories comprises: a command decoder suitable for decoding the command and the address to extract an encryption key which is dedicated for the corresponding memory; an address encryption circuit suitable for generating an encrypted address by encrypting the address using the encryption key; and a cell array accessed by the encrypted address.

BRIEF DESCRIPTION OF THE DRAWINGS

FIG. 3 is a flowchart describing an operation of a memory system in accordance with an embodiment of the present invention.

FIG. 4 illustrates locations of memory cells that are accessed in cell arrays of each of memories.

DETAILED DESCRIPTION

Figure 1:
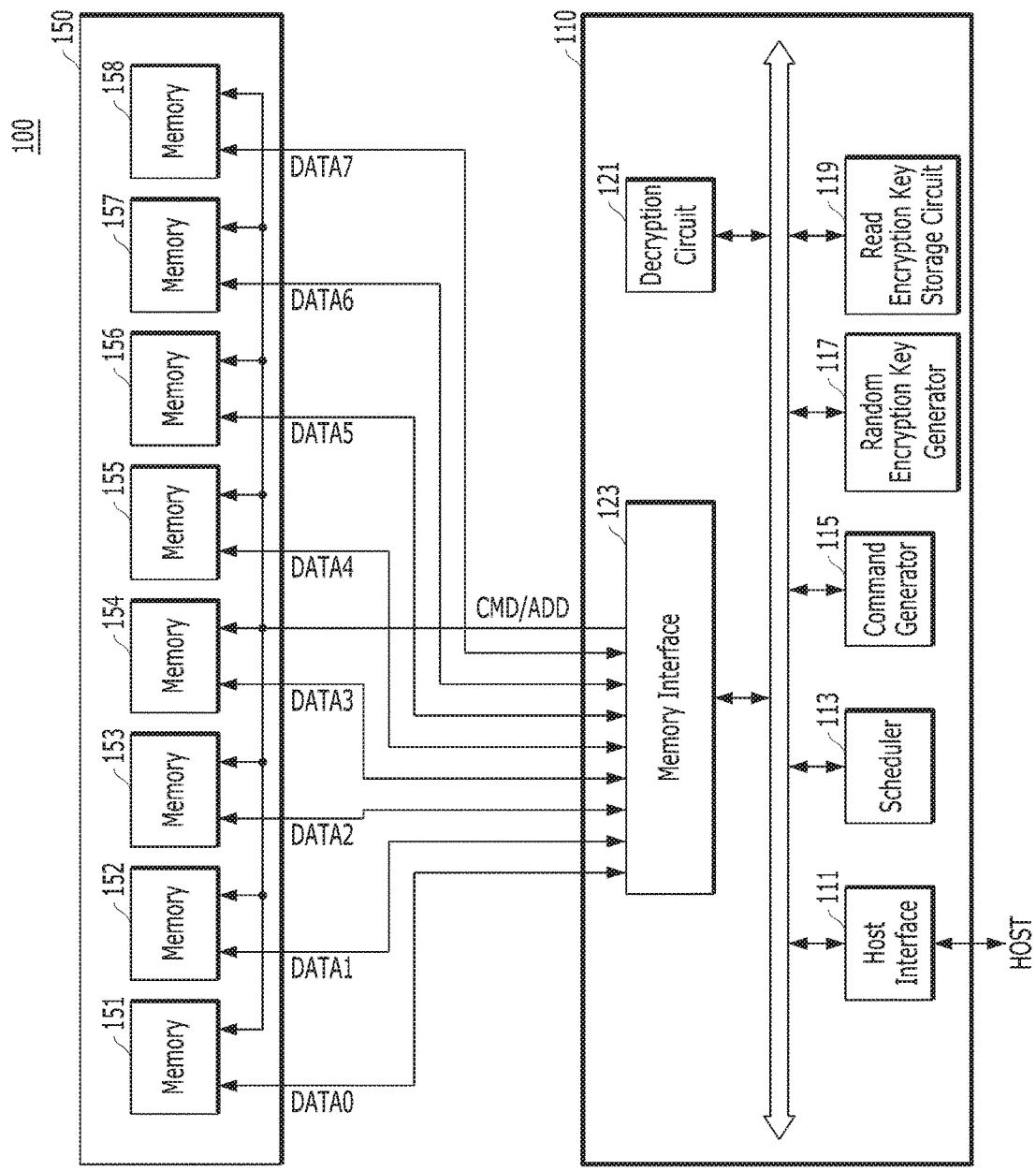
FIG. 1 is a block diagram illustrating a memory system in accordance with an embodiment of the present invention.

Various embodiments of the present invention are described below in more detail with reference to the accompanying drawings. The present invention may, however, be embodied in different forms and should not be construed as limited to the embodiments set forth herein. Rather, these embodiments are provided so that this disclosure is thorough and complete, and fully conveys the scope of the present invention to those skilled in the art. Throughout the disclosure, like reference numerals refer to like parts throughout the various figures and embodiments of the present invention. Also, throughout the specification, reference to "an embodiment" or the like is not necessarily to only one embodiment, and different references to any such phrase are not necessarily to the same embodiment(s).

FIG. 1 is a block diagram illustrating a memory system 100 in accordance with an embodiment of the present invention.

Referring to FIG. 1, the memory system 100 may include a memory controller 110 and a memory module 150.

The memory controller 110 may control overall operations of the memory module 150, such as a write operation and a read operation, according to a request from the host HOST. The host HOST may include a Central Processing Unit (CPU), a Graphic Processing Unit (GPU), an Application Processor (AP) and the like. The memory controller 110 may be included inside of the host HOST, i.e., the memory controller 110 and the host HOST may be integrated into one device. In some cases, memory controller 110 may be included outside of the host, i.e., the memory controller 110 and the host HOST may be separate devices. When the memory controller 110 is included inside of the host HOST, the host HOST in the drawing may represent a constituent element other than the memory controller 110 in the host. In the following description, the memory controller 110 and the host HOST will be described as being separate from each other. The memory controller 110 may include a host interface 111, a scheduler 113, a command generator 115, a random encryption key generator 117, a read encryption key storage circuit 119, a decryption circuit 121, and a memory interface 123.

The host interface 111 may be an interface between the memory controller 110 and the host HOST. Requests from the host HOST may be received via the host interface 111, and processing results according to the requests may be transferred to the host HOST via the host interface 111.

The scheduler 113 may decide the order of the requests to be transferred to the memory module 150, among the requests from the host HOST. The scheduler 113 may schedule the order of the requests received from the host HOST and the order of operations to be processed by the memory module 150 differently in order to improve the performance of the memory module 150. For example, even though the host HOST requests a read operation of the memory module 150 first and then requests a write operation later, the scheduler 113 may adjust the order in such a manner that the write operation is performed prior to the read operation.

The command generator 115 may generate a command to be applied to the memory module 150 in accordance with the order of the operations determined by the scheduler 113.

The random encryption key generator 117 may randomly generate encryption keys. The random encryption key generator 117 may generate the encryption keys respectively corresponding to memories 151 to 158 included in the memory module 150. The random encryption key generator 117 may be able to generate different encryption keys for each of the memories 151 to 158 included in the memory module 150. For example, as shown in FIG. 1, when the memory module 150 includes eight memories 151 to 158, eight different encryption keys may be randomly generated. Meanwhile, the encryption keys generated by the random encryption key generator 117 may be transferred to the memories 151 to 158 of the memory module 150 through the memory interface 123.

The read encryption key storage circuit 119 may store the encryption keys generated by the random encryption key generation 117.

The decryption circuit 121 may decrypt data that are read from the memory module 150 by using the encryption keys stored in the read encryption key storage circuit 119. The decryption circuit 121 may decrypt the data that are read from each of the eight memories 151 to 158 by using eight encryption keys. For example, among the eight encryption keys, by using the encryption key that is used by the memory 152 during a write operation, the decryption circuit 121 may decrypt the data read from the memory 152 during a read operation.

The memory interface 123 may be an interface between the memory controller 110 and the memory module 150. A command CMD and an address ADD may be transferred to the memory module 150 from the memory controller 110 via the memory interface 123. Data DATA0 to DATA7 may be transferred and received between the memory controller 110 and the memory module 150 via the memory interface 123. The memories 151 to 158 in the memory module 150 may receive the command CMD and the address ADD in common from the memory controller 110. On the other hand, the memories 151 to 158 may transfer/receive different data DATA0 to DATA7 to/from the memory controller 110. In other words, a command address bus between the memory controller 110 and the memories 151 to 158 may be shared by the memories 151 to 158 as a common bus, while the data buses between the memory controller 110 and the memories 151 to 158 are dedicated for each of the memories 151 to 158. The memory interface 123 may also be referred to as a PHY (physical) interface. Meanwhile, the encryption keys generated by the random encryption key generator 117 may be transferred from the memory controller 110 to the memory module 150 via the memory interface 123, in the form of the command CMD and the address ADD.

The memory module 150 may include a plurality of memories 151 to 158. The memories 151 to 158 may perform operations such as a read operation and a write operation under the control of the memory controller 110. Since the memories 151 to 158 receive the same command CMD and the same address ADD from the memory controller 110, they may perform a read operation and a write operation at the same time. For example, in order that the memory controller 110 writes 512-bit data to the memory module 150 in a single write operation, 64-bit data may be written in each of the memories 151 to 158 in the memory module 150. Also, in a read operation, the 64-bit data may be read from each of the memories 151 to 158 so that the 512-bit data can be transferred from the memory module 150 to the memory controller 110. In other words, the 512-bit data word may be distributively written in the eight memories 151 to 158 during a write operation, and the 512-bit data word may be read by reading the 64-bit data from the eight memories 151 to 158 during a read operation. The memory module 150 may be a Dual In-line Memory Module (DIMM).

Figure 2:
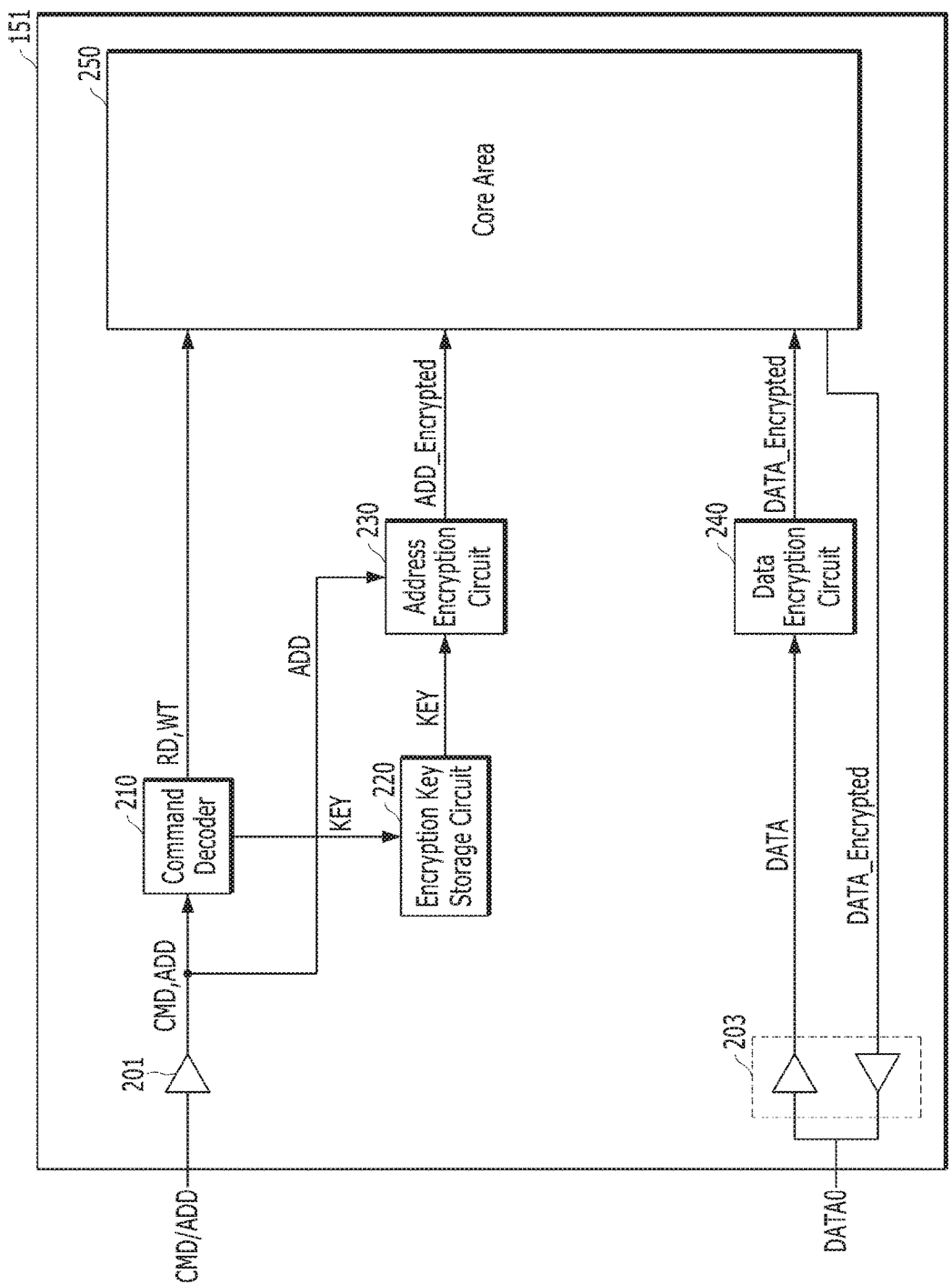
FIG. 2 is a detailed block diagram illustrating a memory shown in FIG. 1.

FIG. 2 is a detailed block diagram illustrating the memory 151 shown in FIG. 1. The other memories 152 to 158 may be configured to have the same structure as shown in FIG. 2.

Referring to FIG. 2, the memory 151 may include a command/address receiving circuit 201, a data transferring/receiving circuit 203, a command decoder 210, an encryption key storage circuit 220, an address encryption circuit 230, a data encryption circuit 240, and a core area 250.

The command/address receiving circuit 201 may receive the command CMD and the address ADD from the memory controller (110 of FIG. 1) via the command/address bus. Each of the command CMD and the address ADD may include mufti-bit signals. The data transferring/receiving circuit 203 may receive the data DATA0 from the memory controller 110 via the data bus or transfer the data DATA0 to the memory controller 110 via the data bus. The data transferring/receiving circuit 203 may receive write data DATA from the memory controller 110 via the data bus during a write operation, and may transfer encrypted data DATA_Encrypted to the memory controller 110 during a read operation.

The command decoder 210 may generate a read signal RD for directing a read operation, a write signal WT for directing a write operation, and signals (not shown) for directing various operations by decoding the command CMD received via the command/address receiving circuit 201. The command decoder 210 may receive and decode not only the command CMD but also all or part of the address ADD.

The encryption key may be transferred from the memory controller 110 to the memory 151 based on the command CMD and the address ADD. The command decoder 210 may decode the command CMD and the address ADD to extract an encryption key KEY and transfer the encryption key KEY to the encryption key storage circuit 220. The encryption key storage circuit 220 may store the encryption key KEY.

The address encryption circuit 230 may generate an encrypted address ADD_Encrypted by encrypting the address ADD received via the command/address receiving circuit 201 based on the encryption key KEY stored in the encryption key storage circuit 220. The address encryption circuit 230 may use various types of encryption methods. The address encryption circuit 230 may simply encrypt the address ADD by a method of performing an XOR operation on the encryption key KEY and the address ADD. The number of bits of the encryption key KEY and the number of bits of the address ADD may be different. In this case, the encryption key KEY may be copied and used. For example, when the encryption key KEY includes 4 bits of '1001' and the address ADD includes 8 bits of '11001101', the address encryption circuit 230 may copy the encryption key KEY to form 8 bits of '10011001' to generate the encrypted address ADD_Encrypted of '01010100' by performing an XOR operation on the encrypted address ADD_Encrypted and the address ADD. Although the address encryption circuit 230 encrypts the entire address ADD transferred from the memory controller 110 as an example, the address encryption circuit 230 may encrypt a part of the address ADD. For example, when the address ADD is formed of a bank address and a normal address such as a row address and a column address, the address encryption circuit 230 may encrypt only the bank address or encrypt only the normal address.

The data encryption circuit 240 may generate encrypted data DATA_Encrypted by encrypting the write data DATA to be stored in the core area 250 by using the encryption key KEY stored in the encryption key storage circuit 220 during a write operation. The data encryption circuit 240 may perform an encryption operation in the same manner as that of the address encryption circuit 230, or the data encryption circuit 240 may perform an encryption operation in a different manner. The data encryption circuit 240 may simply encrypt the write data DATA by a method of performing an XOR operation on the encryption key KEY and the write data DATA. The number of bits of the encryption key KEY and the number of bits of the write data DATA may be different. In this case, the encryption key KEY may be copied and used. For example, when the encryption key KEY includes 4 bits of '1001' and the write data DATA includes 10 bits of '1100010110', the data encryption circuit 240 may copy the encryption key KEY to form 10 bits of '1001100110' to generate the encrypted data DATA_Encrypted of '0101110000' by performing an XOR operation on the encryption key KEY and the write data DATA.

The core region 250 may include a cell array including a plurality of memory cells, and peripheral circuits for writing and reading data in and from the cell array. The encrypted data DATA_Encrypted may be written into the memory cells that are selected from the core area 250 based on the encrypted address ADD_Encrypted during a write operation in which the write signal WT is activated. The encrypted data DATA_Encrypted may be read from the memory cells that are selected from the core area 250 based on the encrypted address ADD_Encrypted during a read operation in which the read signal RD is activated.

FIG. 3 is a flowchart describing an operation of a memory system in accordance with an embodiment of the present invention. Hereinafter, an operation of the memory system 100 shown in FIG. 1 will be described.

Referring to FIG. 3, the random encryption key generator 117 of the memory controller 110 may generate encryption keys in step S301. The random encryption key generator 117 may randomly generate the eight encryption keys respectively corresponding to the eight memories 151 to 158 included in the memory module 150 (e.g., 8). Since the encryption keys are randomly generated, the eight encryption keys may be different from each other. The eight encryption keys may be stored in the read encryption key storage circuit 119.

The memory controller 110 may transfer the encryption keys to the memories 151 to 158 of the memory module 150 in step S303. The memory controller 110 may transfer different encryption keys to the memories 151 to 158 in the form of a command CMD and an address ADD through the command/address bus. The command/address bus may be shared by all of the memories 151 to 158, but it may be possible to transfer each of the encryption keys to a corresponding one of the memories 151 to 158 based on a Per DRAM Addressability (PDA) mode or a Multi-Purpose Command (MPC) mode, which may be set individually for each of the memories 151 to 158. The command decoder 210 of each of the memories 151 to 158 may extract an encryption key KEY by decoding the command CMD and the address ADD. The encryption key storage circuit 220 of each of the memories 151 to 158 may store the encryption key KEY transferred from the memory controller 150. For example, encryption key storage circuit 220 of each of the memories 151 to 158 may store the encryption key KEY transferred from the memory controller 150, during an initialization operation of the memory system.

In FIG. 3, a reference numeral '310' may denote a write operation of the memory system 100, and a reference numeral '350' may denote a read operation of the memory system 100. Hereafter, the write operation 310 will be described first.

The memory controller 110 may transfer a write command, an address corresponding to the write command, and write data to the memories 151 to 158 of the memory module 150 in step S311. The write command and the address may be transferred to the memories 151 to 158 via the command/address bus, and the write data may be transferred to the memories 151 to 158 via the data buses.

The address encryption circuit 230 of each of the memories 151 to 158 may generate an encrypted address ADD_Encrypted by encrypting the address ADD by using the encryption key KEY which is stored in the encryption key storage circuit 220 in step S313.

The data encryption circuit 240 of each of the memories 151 to 158 may generate encrypted data DATA_Encrypted by encrypting the write data DATA by using the encryption key KEY which is stored in the encryption key storage circuit 220 in step S315.

The encrypted data DATA_Encrypted may be written into the memory cells that are selected based on the encrypted address ADD_Encrypted in the cell array of the core region 250 of each of the memories 151 to 158, in step S317.

The memory controller 110 may transfer the same address ADD to the memories 151 to 158 during a write operation. However, since the memories 151 to 158 encrypt the addresses ADD with different encryption keys KEY, the encrypted addresses ADD_Encrypted may be different for each of the memories 151 to 158. This may mean that the locations of the memory cells to be accessed in the memories 151 to 158 of the memory module 150 are all different. FIG. 4 illustrates locations of memory cells that are accessed in the cell arrays of each of the memories 151 to 158. The hatched portion may indicate the locations of the accessed memory cells. Herein, it may be seen that the locations of the accessed memory cells are different for each of the memories 151 to 158.

Hereafter, the read operation 350 of the memory system 100 is described.

The memory controller 110 may transfer a read command and an address corresponding to the read command to the memories 151 to 158 of the memory module 150 in step S351. The read command and the address may be transferred to the memories 151 to 158 via the command/address bus.

The address encryption circuit 230 of each of the memories 151 to 158 may generate an encrypted address ADD_Encrypted by encrypting the address ADD by using the encryption key KEY which is stored in the encryption key storage circuit 220 in step S353.

The encoded data DATA_Encrypted may then be read from the memory cells that are selected based on the encrypted address ADD_Encrypted in the cell array of the core region 250 of each of the memories 151 to 158, in step S355. The memory controller 110 may transfer the same address ADD to the memories 151 to 158 during a read operation. However, since the memories 151 to 158 encrypt the address ADD by using different encryption keys KEY, the encrypted addresses ADD_Encrypted may be different for each of the memories 151 to 158. In other words, during the read operation, the locations of the accessed memory cells may be different for each of the memories 151 to 158 as shown in FIG. 4, likewise for the write operation.

The encrypted data DATA_Encrypted may then be transferred from the memories 151 to 158 to the memory controller 110 in step S357. The encrypted data DATA_Encrypted may be transferred from the memories 151 to 158 to the memory controller 110 via the data buses.

The decryption circuit 121 of the memory controller 110 may decrypt the encrypted data DATA_Encrypted that are read from the memories 151 to 158 by using the encryption keys stored in the read encryption key storage circuit 119. Since the same encryption keys as the memories 151 to 158 are stored in the read encryption key storage circuit 119, the decryption circuit 121 may decrypt the encrypted data DATA_Encrypted that are transferred from the memories 151 to 158 by using the encryption keys. For example, the decryption circuit 121 may decrypt the encrypted data DATA_Encrypted transferred from the memory 151 by performing an XOR operation on the encrypted data DATA_Encrypted and the encryption key corresponding to the memory 151, and decrypt the encrypted data DATA_Encrypted transferred from the memory 152 by performing an XOR operation on the encrypted data DATA_Encrypted and the encryption key corresponding to the memory 152.

Referring to FIGS. 1 to 4, the encryption of the address in the memory system 100 is performed based on the encryption keys of the memories 151 to 158 that are different from each other, during a read operation and a write operation. It may be seen that different areas are accessed in the cell array of each of the memories 151 to 158. In other words, when the memory controller 110 distributively writes one data word (e.g., 512-bit data) into the memories 151 to 158 by 64-bit data for each memory, the distributed data may be written in different locations for each of the memories 151 to 158. Therefore, it is impossible to restore the data word which is distributively stored in the memories 151 to 158 without the encryption key. When the memory module 150 is frozen with liquid nitrogen to retain the data stored in the core region 250 and the memory module 150 is connected to another computer system, the data stored in the cell array of the core region 250 may be retained. However, since the encryption key KEY is not stored in the memory cell, the encryption key KEY may not be retained. Therefore, data leakage may be prevented.

Also, in the memory system 100, the encryption of the write data may be performed by each of the memories 151 to 158, and the decryption of the read data may be performed based on the method of the memory controller 110. Therefore, it may be more difficult to decrypt the data by using the encryption key.

Although FIGS. 1 to 4 illustrate that both the address encryption and the data encryption are performed in the memory system 100, it is obvious to those skilled in the art that the memory system 100 may perform only the encryption operation of the address or only the encryption operation of data.

According to the embodiment of the present invention, the security level of a memory system may be raised.

While the present invention has been described with respect to the specific embodiments, it will be apparent to those skilled in the art that various changes and modifications may be made without departing from the spirit and scope of the invention as defined in the following claims.

What is claimed is:

1. A memory module, comprising:
a plurality of memories,
wherein each of the memories comprises:
an encryption key storage circuit configured to store an encryption key;
an address encryption circuit configured to generate an encrypted address by encrypting an address transferred from a memory controller by using the encryption key stored in the encryption key storage circuit; and
a cell array accessed by the encrypted address, wherein the encryption key storage circuits of the memories store different encryption keys,
wherein each of the memories further comprises:
a data encryption circuit configured to generate encrypted data by encrypting write data transferred from the memory controller by using the encryption key stored in the encryption key storage circuit during a write operation, and
wherein the encrypted data are written in the cell array.

2. The memory module of claim 1, wherein the memories share a command/address bus to receive a command and an address from the memory controller through the command/address bus.

3. The memory module of claim 1, wherein memory cells of different locations are accessed in the cell arrays of the memories, during a read operation and a write operation.

4. The memory module of claim 1, wherein each of the memories receives a different encryption key from the memory controller, and stores the different encryption key in the encryption key storage circuit of the corresponding memory.

5. A method for operating a memory module including a plurality of memories, comprising:
storing different encryption keys in each of the memories;
receiving a command and an address in the memories;
generating an encrypted address by encrypting the address in each of the memories by using the encryption key of the corresponding memory;
accessing an area designated by the encrypted address in each of the memories;
receiving write data when the command is a write command, in the receiving of the command and the address in the memories;
generating an encrypted data by encrypting the write data in each of the memories by using the encryption key of the corresponding memory in the encrypting of the address; and
writing the encrypted data in the designated area of each of the memories in the accessing of the area designated by the encrypted address.

6. The method of claim 5, further comprising:
reading data from the designated area of each of the memories when the command is a read command, in the accessing of the area designated by the encrypted address.

7. The method of claim 5, wherein areas of different locations are accessed in the memories in the accessing of the area designated by the encrypted address.

8. A memory system, comprising:
a plurality of memories; and
a memory controller configured to transfer a common command and a common address to the memories, and
wherein each of the memories comprises:
an encryption key storage circuit configured to store an encryption key;
an address encryption circuit configured to generate an encrypted address by encrypting the common address by using the encryption key stored in the encryption key storage circuit; and
a cell array accessed by the encrypted address,
wherein the encryption key storage circuits of the memories store different encryption keys,
wherein each of the memories further comprises:
a data encryption circuit configured to generate encrypted data by encrypting write data transferred from the memory controller by using the encryption key stored in the encryption key storage circuit during a write operation, and
wherein the encrypted data are written in the cell array.

9. The memory system of claim 8, wherein each of the memories further comprises:
a data encryption circuit configured to generate encrypted data by encrypting write data transferred from the memory controller by using the encryption key stored in the encryption key storage circuit during a write operation,
wherein the encrypted data are written in the cell array, and
wherein the memory controller comprises:
a read encryption key storage circuit configured to store the different encryption keys of the memories; and
a decryption circuit configured to decrypt data that are read from the memories by using the encryption keys stored in the read encryption key storage circuit during a read operation.

10. The memory system of claim 9, wherein the memory controller further includes:
a host interface configured to communicate between a host and the memory controller;
a scheduler configured to schedule operations of the memories;
a command generator configured to generate the common command to be applied to the memories; and
a memory interface configured to communicate with the memories.

11. A memory system, comprising:
a plurality of memories; and
a memory controller,
wherein each of the memories comprises:
an encryption key storage circuit configured to store an encryption key which is different for each of the memories;
a data encryption circuit configured to generate an encrypted data by encrypting write data which is transferred from the memory controller by using the encryption key stored in the encryption key storage circuit during a write operation; and
a cell array configured to store the encrypted data,
wherein the memory controller comprises:
a read encryption key storage circuit configured to store the different encryption keys of the memories; and
a decryption circuit configured to decrypt data that are read from the memories by using the encryption keys stored in the read encryption key storage circuit during a read operation,
wherein each of the memories further comprises:
a data encryption circuit configured to generate encrypted data by encrypting write data transferred from the memory controller by using the encryption key stored in the encryption key storage circuit during a write operation, and
wherein the encrypted data are written in the cell array.

12. The memory system of claim 11, wherein each of the memories receives corresponding one of the different encryption keys from the memory controller and stores the corresponding encryption key in the encryption key storage circuit, during an initialization operation of the memory system.

13. The memory system of claim 11, wherein the memory controller includes:
  a host interface configured to communicate between a host and the memory controller;
  a scheduler configured to schedule operations of the memories;
  a command generator configured to generate a command to be applied to the memories; and
a memory interface configured to communicate with the memories.

14. A method for operating a memory system including a plurality of memories and a memory controller, comprising:
  transferring different encryption keys from the memory controller to the memories;
  transferring a command and an address from the memory controller to the memories;
  generating an encrypted address by encrypting the address by using an encryption key in each of the memories;
  accessing an area designated by the encrypted address in each of the memories;
  receiving write data transferred from the memory controller to the memories when the command is a write command, in the transferring of the command and the address;
  generating an encrypted data by encrypting the write data by using the encryption key of each of the memories in the encrypting of the address; and
  writing the encrypted data in the area designated in each of the memories in the accessing of the area designated by the encrypted address.

15. The method of claim 14, further comprising:
  reading data from the area designated by the encrypted address in each of the memories when the command is a read command;
  transferring the data read from the memories to the memory controller; and
  decrypting the data transferred from the memories in the memory controller by using the encryption keys of the memories.

16. A method for operating a memory system including a plurality of memories and a memory controller, comprising:
  transferring different encryption keys from the memory controller to the memories;
  transferring a write command and data from the memory controller to the memories;
  generating an encrypted data by encrypting the data by using an encryption key in each of the memories;
  storing the encrypted data in each of the memories;
  transferring a read command from the memory controller to the memories;
  transferring the data read from the memories to the memory controller;
  decrypting the data transferred from the memories in the memory controller by using the encryption keys of the memories; and
  generating encrypted data by encrypting write data transferred from the memory controller by using the encryption keys of the memories during a write operation,
  wherein the encrypted data are written in a cell array.

17. A memory system, comprising:
  a plurality of memories; and
  a memory controller configured to transfer a command and an address to the memories,
  wherein each of the memories comprises:
    a command decoder configured to decode the command and the address to extract an encryption key which is dedicated for the corresponding memory;
    an address encryption circuit configured to generate an encrypted address by encrypting the address using the encryption key; and
    a cell array accessed by the encrypted address,
  wherein each of the memories further comprises:
    a data encryption circuit configured to generate encrypted data by encrypting write data transferred from the memory controller by using the encryption key stored in the encryption key storage circuit during a write operation, and
  wherein the encrypted data are written in the cell array.

18. The memory system of claim 17, wherein the memory controller transfers the command and the address to the memories through a shared command/address bus.

19. The memory system of claim 17, wherein the memory controller comprises:
  a random encryption key generator configured to generate the encryption keys respectively corresponding to memories; and
  a memory interface configured to transfer the encryption keys to the memories in the form of the command and the address.

20. The memory system of claim 19, wherein the memory controller further comprises:
  a read encryption key storage circuit configured to store the encryption keys of the memories; and
  a decryption circuit configured to decrypt data that are read from the memories by using the encryption keys stored in the read encryption key storage circuit during a read operation.

* * * * *